United States Patent [19]

Amano et al.

[11] Patent Number: 4,504,756
[45] Date of Patent: Mar. 12, 1985

[54] ELECTRICAL SPEED SENSOR

[75] Inventors: Hiroyuki Amano; Naoji Sakakibara, both of Aichi, Japan

[73] Assignee: Aisin Seiki Kabushiki Kaisha, Kariya, Japan

[21] Appl. No.: 89,665

[22] Filed: Oct. 30, 1979

[30] Foreign Application Priority Data

Nov. 28, 1978 [JP] Japan ............................ 53-164018[U]

[51] Int. Cl.³ ............................................. H02K 19/20
[52] U.S. Cl. ................................... 310/168; 310/75 C
[58] Field of Search ................. 310/168, 83, 105, 171, 310/75 R, 750, 78 C; 324/164, 170–173

[56] References Cited

U.S. PATENT DOCUMENTS

| 2,368,700 | 2/1945 | Bilde | 310/75 C |
| 3,619,680 | 11/1971 | Okamoto | 310/160 |
| 3,719,841 | 3/1973 | Ritsema | 310/168 X |
| 4,189,433 | 6/1979 | Takayama et al. | 310/168 |

Primary Examiner—Donovan F. Duggan
Attorney, Agent, or Firm—Sughrue, Mion, Zinn, Macpeak and Seas

[57] ABSTRACT

In an electrical speed sensor for generating an electrical signal proportional to the rotational speed of a vehicle wheel, a first shaft is rotatably mounted and is adapted to be operatively interconnected with an output shaft of the vehicle transmission. The first shaft carries a rotor of magnetic material which is cooperable with a stationary rotor of magnetic material to provide an output signal indicative of the rotational speed. A second shaft is rotatably mounted at a fixed angle relative to the first shaft in operative driven engagement therewith. The rotatable core of a speedometer cable is coupled to one end of the second shaft for rotation therewith to operate the vehicle speedometer.

3 Claims, 3 Drawing Figures

ELECTRICAL SPEED SENSOR

BACKGROUND OF THE INVENTION

1. Field of the Invention

The present invention is directed to an electrical speed sensor for motor vehicles and more particularly to the connecting drive between such an electrical speed sensor and a speedometer cable.

2. Prior Art

Conventional electrical speed sensors for motor vehicles have been used to generate electrical control signals which are proportional to the rotational speed of a vehicle wheel in order to control vehicle related systems such as an anti-skid braking control system. Such electrical speed sensors have also been used for indicating the rotational speed of the vehicle wheel on the vehicle speedometer. An example of such an arrangement is disclosed in U.S. Pat. No. 4,159,433 to Takayama et al, granted June 26, 1979. In the electrical speed sensor disclosed in this patent, a shaft is rotatably mounted in operative driving engagement with a vehicle transmission shaft. A rotor is mounted on the shaft for generating an electrical signal and the rotatable core of the speedometer cable is connected directly to one end of the rotatable shaft. Since the electrical speed sensor is usually located in narrow, confined spaces close to the vehicle body frame, it is often necessary to bend the speedometer cable very sharply adjacent its connection to the rotatable shaft of the electrical speed sensor. As a result of such a sharp curvature, the cable core may not be rotated smoothly within the cable with a resultant erroneous indication of the vehicle speed on the vehicle speedometer.

SUMMARY OF THE INVENTION

The present invention provides a new and improved electrical speed sensor which is capable of providing an electrical signal in proportion to the rotational speed of a vehicle wheel while providing a driving arrangement for the speedometer cable to ensure an accurate indication of the vehicle speed on the speedometer.

The present invention provides a new and improved electrical speed sensor wherein a first shaft is rotatably mounted within the casing for operative engagement with a vehicle transmission shaft and for operative engagement with a second shaft rotatably mounted in the casing at a fixed acute angle. The first shaft is provided with a rotor which is cooperable with a stator and an electrical coil to provide an output signal indicative of the rotational speed of a vehicle wheel and one end of the second shaft is connected to the rotatable core of a speedometer cable. The angled connection between the first and second rotatable shafts eliminates the necessity of sharply curving the cable in confined mounting areas for the speed sensor to ensure an accurate reading on the speedometer.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
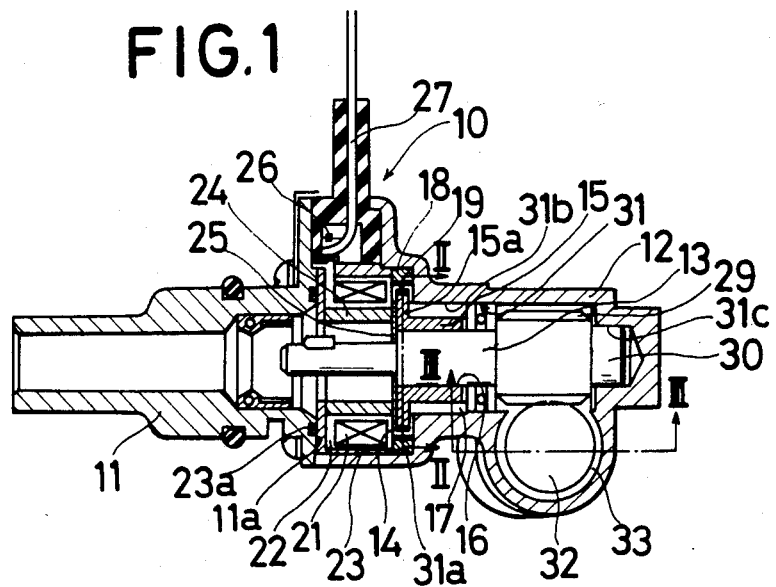
FIG. 1 is an axial sectional view of an electrical speed sensor according to the present invention.
Figure 2:
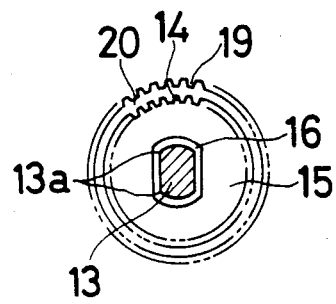
FIG. 2 is a sectional view taken along the line II—II of FIG. 1.

The electrical speed sensor 10 of the present invention is provided with a sleeve 11 secured to a casing 12 by any suitable means. The sleeve 11 is secured to a portion of the housing of a vehicle transmission (not shown). The casing 12 is provided with a stepped blind bore 31 having a larger diameter portion 31a, an intermediate diameter portion 31b and a smaller diameter portion 31c. A first shaft 13 is rotatably mounted in the blind bore 31 and the left end portion of the shaft 13 as viewed in FIG. 1 is adapted to be operatively connected to an output shaft (not shown) of the vehicle transmission through a connecting shaft (not shown) which is adapted to be rotatably mounted in the sleeve 11.

A rotor 15 of magnetic material is rotatably mounted in the intermediate diameter portion 31b of the bore 31 by means of bearing 17 and the first shaft 13 extends through a central aperture 16 in the rotor 15 with substantial clearance. The sides of the first shaft 13 are flattened to provide four corners 13a so that the cross-sectional configuration of the shaft 13 is substantially rectilinear. The aperture 16 in the rotor 15 is provided with a complimentary cross-sectional configuration and the clearance between the shaft 13 and the aperture 16 avoids any substantial vibration in spite of radial deflections, tolerances in the manufacture or misalignment of the first shaft 13.

The rotor 15 is provided with an annular flange 15a which projects radially outwardly at the left end thereof as viewed in FIG. 1. A plurality of regular teeth 14 are formed on the periphery of the flange 15a. The flange 15a is surrounded by a stator 18 of magnetic material which is non-rotatably mounted in the larger diameter portion 31a of the bore 31. The stator 18 is provided with a plurality of regular teeth 19 about the inner periphery thereof which are spaced from the teeth 14 by an annular air gap 20.

An electrical coil 21 is wound on a resin bobbin 22 within which the annular permanent magnet 24 is fixedly secured. The yoke 23 is fixedly secured within the larger diameter portion 31a of the bore 31 and the bobbin, coil and permanent magnet assembly are located within the yoke 23. A thrust washer 25 is interposed between the magnet 24 and the flange 15a of the rotor 15. The yoke 23 is provided with a radially inwardly directed flange 23a which abutts the end wall 11a of the sleeve 11. Both ends of the coil 21 are electrically connected to the wires 27 by means of a clamping device 26.

Figure 3:
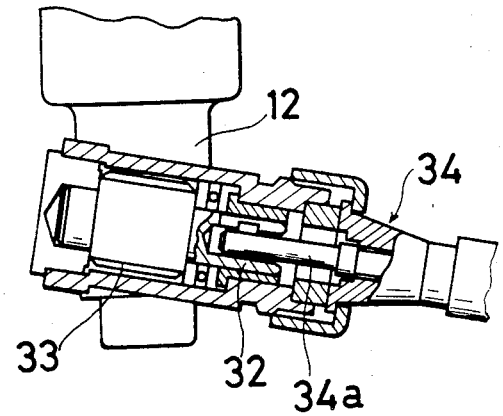
FIG. 3 is a sectional view taken along the line III—III of FIG. 1.

The first shaft 13 is rotatably mounted in the smaller diameter portion 31c of the bore at the right end 30 thereof and a gear-tooth portion 29 is provided with the intermediate diameter portion 31b intermediate the end 30 and the rotor 15. A second shaft 32 is rotatably mounted within the casing 12 at a fixed acute angle relative to the shaft 13 as best seen in FIG. 3. The second shaft 32 is provided with a gear-tooth portion 33 disclosed in meshing driving engagement with the gear-tooth portion 29 of the shaft 13. A speedometer cable is secured to the end of the casing 12 containing the second shaft 32 and the rotatable core 34a of the speedometer cable 34 is coupled to the shaft 32 by means of a splined connection.

In operation, when the output shaft of the transmission is rotated, the connecting shaft, the first shaft 13 and the second shaft 32 are rotated. Since the speedometer cable 34 is operatively connected between the second shaft 32 and the speedometer (not shown) of the motor vehicle, the rotatable core 32a will be driven and the rotational speed of a vehicle wheel will be accurately indicated on the speedometer. As best seen in FIG. 3, the rotatable core 34a of the speedometer cable and the second shaft 32 are disposed in direct axial alignment so that there is no sharp bend in the cable as would be the case if the cable 34 were connnected directly to the end of the first shaft 13.

The rotation of the shaft 13 will also be transmitted to the rotor 15 without any undue vibration so that the flange 15a of the rotor 15 will rotate smoothly and concentrically within the stator 18 to maintain a constant air gap. Since the rotor 15, the stator 18, the washer 25 and the yoke 23 are all of magnetic material, a magnetic flux circuit is formed about the coil 21. As the teeth 14 of the rotor 15 and the teeth 19 of the stator 18 are disposed in opposing magnetic confrontation with each other, the rotation of the rotor 15 relative to the stator 18 causes the magnetic reluctance of the air gap 20 to vary thus producing an electrical signal from the coil 21. The electrical signal is proportional to the rotational speed of a vehicle wheel to be used as a signal for controlling vehicle related systems such as an anti-skid brake control system.

While the invention has been particularly shown and described with reference to a preferred embodiment thereof, it will be understood by those in the art that various changes in form and details may be made therein without departing from the spirit and scope of the invention.

What is claimed is:

1. In an electrical speed sensor of the type for generating an electrical signal proportional to the rotational speed of a vehicle wheel comprising a casing, a first shaft rotatable within said casing, magnetic rotor means driven by said first shaft, magnetic circuit means secured to said casing and associated with said magnetic rotor means and an electrical coil associated with said magnetic circuit means, the improvement comprising a second shaft rotatably mounted in said casing with the axis thereof disposed at a fixed acute angle relative to the axis of said first shaft, means rotatably interconnecting said second shaft to said first shaft and means at one end of said second shaft adapted to be connected to a speedometer cable.

2. In an electrical speed sensor as set forth in claim 1, wherein said means for rotatably connecting said second shaft to said first shaft comprising gear-teeth on each shaft disposed in meshing engagement with each other.

3. In an electrical speed sensor as set forth in claim 2, wherein said magnetic rotor means is provided with a shaped aperture and said first shaft is provided with a portion having a complimentary shaped configuration extending through said aperture with substantial clearance to prevent transmission of vibrations from said first shaft to said magnetic rotor means.

* * * * *